United States Patent [19]

Tochihara et al.

[11] Patent Number: 5,078,790
[45] Date of Patent: Jan. 7, 1992

[54] INK, INK-JET RECORDING PROCESS, AND INSTRUMENT MAKING USE OF THE INK

[75] Inventors: Shinichi Tochihara, Hadano; Makoto Aoki, Yokohama; Kumiko Mafune, Kawasaki; Osamu Nishiwaki, Atsugi; Kenji Aono, Kawasaki; Akira Nagashima, Tokyo, all of Japan

[73] Assignee: Canon Kabushiki Kaisha, Tokyo, Japan

[21] Appl. No.: 651,423

[22] Filed: Feb. 6, 1991

[30] Foreign Application Priority Data

Feb. 9, 1990 [JP] Japan ................................. 2-30658
Jan. 23, 1991 [JP] Japan ................................. 3-006382

[51] Int. Cl.⁵ .................................................. C09D 11/02
[52] U.S. Cl. ....................................... 106/20; 106/22
[58] Field of Search ............................. 106/20, 22

[56] References Cited

U.S. PATENT DOCUMENTS

| | | | |
|---|---|---|---|
| 3,985,663 | 12/1976 | Lu et al. | 106/22 |
| 4,171,983 | 10/1979 | Farmer,III et al. | 106/22 |
| 4,554,555 | 11/1985 | Aruga et al. | 106/20 |
| 4,874,894 | 10/1989 | Kannan | 564/93 |
| 4,966,480 | 10/1990 | Watanabe et al. | 401/134 |
| 4,975,117 | 12/1990 | Tabayashi et al. | 106/22 |

FOREIGN PATENT DOCUMENTS

| | | |
|---|---|---|
| 0224909 | 6/1987 | European Pat. Off. |
| 3706434 | 9/1987 | Fed. Rep. of Germany |
| 54-104933 | 8/1979 | Japan |
| 104933 | 8/1979 | Japan |
| 143305 | 11/1979 | Japan |
| 55-29546 | 3/1980 | Japan |
| 059757 | 4/1984 | Japan |
| 62-14189 | 4/1987 | Japan |

OTHER PUBLICATIONS

Derwent Abstract (WPI) No. 79-70706B with Respect to Japanese Patent Document No. 54-104933 (Aug. 17, 1979).

Primary Examiner—William R. Dixon, Jr.
Assistant Examiner—Helene Klemanski
Attorney, Agent, or Firm—Fitzpatrick, Cella, Harper & Scinto

[57] ABSTRACT

An ink comprises a recording agent and a liquid medium capable of dissolving or dispersing the recording agent, wherein said ink contains both a compound represented by the following Formula (I) and a compound represented by the following Formula (II):

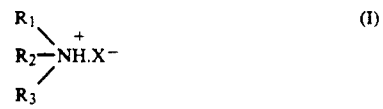

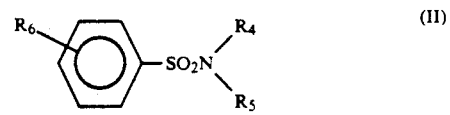

wherein $R_1$, $R_2$ and $R_3$ each represent an alkyl group or a hydroxyalkyl group, and any one of them may represent a hydrogen atom; $X^-$ represents an inorganic acid ion; $R_4$ and $R_5$ each represent a group selected from a hydrogen atom, an alkyl group and a hydroxyalkyl group; and $R_6$ represents a group selected from a carboxyl group, a hydroxyl group, a sulfone group, an alkyl group and a hydrogen atom. The ink is suitably used in the ink-jet recording.

5 Claims, 3 Drawing Sheets

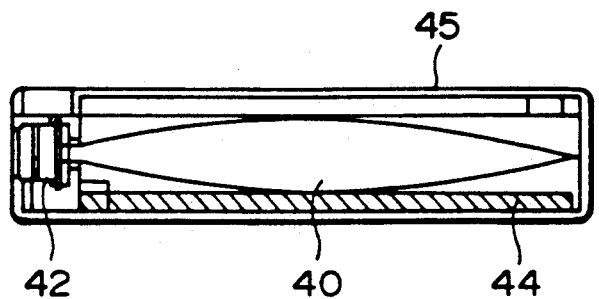
F I G. 4
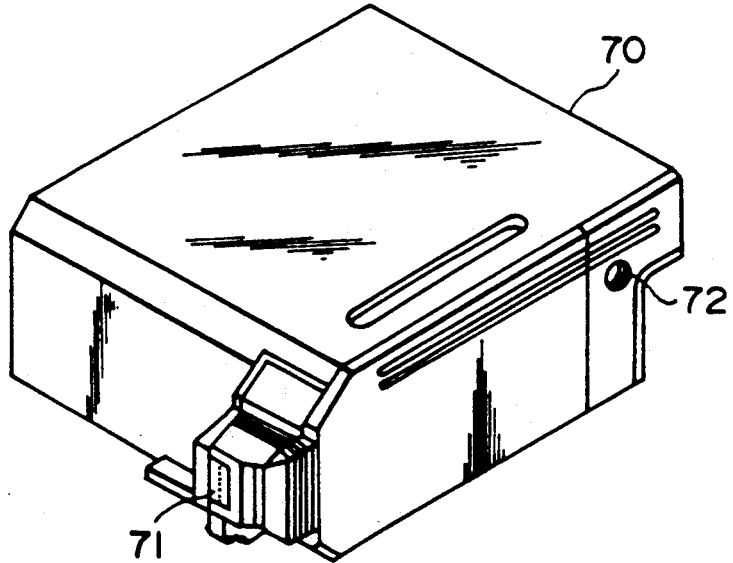
F I G. 5

INK, INK-JET RECORDING PROCESS, AND INSTRUMENT MAKING USE OF THE INK

BACKGROUND OF THE INVENTION

1. Field of the Invention

The present invention relates to an ink, an ink-jet recording process, and instrument making use of the ink. More particularly it relates to an ink, an ink-jet recording process, a recording unit, an ink-jet recording apparatus and an ink cartridge that are capable of achieving excellent anti-clogging characteristics and also of making a good record even on non-coated paper such as wood free paper, medium wood free paper or bond paper, i.e., what is called plain paper, commonly used in offices and so forth.

2. Related Background Art

Inks with various compositions have been hitherto reported with respect to inks for writing implements such as fountain pens, marking pens and water-based ink ball-point pens and inks for ink-jet recording.

In particular, in recent years, detailed research and development has been made from various approaches such as composition and physical properties, with respect to inks for making a good record even on plain paper such as copy paper, reporting paper, notepaper or letter paper commonly used in offices.

For example, inks usually contain high-boiling organic solvents such as glycols for the purposes of anti-drying, anti-clogging and so forth. When recording is carried out using such inks on a plain paper having a high degree of sizing, ink does not readily penetrate the paper and the part on which a record has been made does not dry well, so that when recorded letters or the like are touched, the hand may be stained with ink or the letters become smeared. Thus, there has been a problem in drying performance of this kind.

Under such circumstances, in order to increase the penetrability of ink into paper, Japanese Patent Application Laid-open No. 55-29546 proposes a method in which a surface active agent is added in ink in a large quantity. In such an instance, the following troubles have been caused: Feathering occurs very frequently on some kind of paper; when the ink is filled in writing implements, the ink falls in drops from the pen point; and when filled in an ink-jet recording head, the ink recedes from the orifice surface depending on the structural conditions of the head, resulting in no ejection of ink, or on the other hand the whole of the orifice surface becomes wet, also resulting in no ejection of ink.

Japanese Patent Application Laid-open No. 54-104933 and Japanese Patent Publication No. 62-14189 disclose a method in which N,N-bis(polyoxyethylene (or -propylene))-p-toluenesulfonamide is added to ink. According to this method the solubility of dyes can be effectively improved, but it is required to use in combination an organic solvent such as a polyhydric alcohol in a fairly large quantity, so that the method has the problem that the ink has a poor drying performance on a recording medium such as paper and may cause a stain upon being touched even after the lapse of a long period of time. For this reason, it is also required to use in combination a surface active agent in order to improve the penetrability into paper. As a result, feathering may occur to give an insufficient print quality level.

There is another problem that, when the ink is used in ink-jet recording and the ejection of ink is stopped, the above compound recedes from the orifice surface upon evaporation of water, etc., and hence has a poor anti-clogging performance.

Besides the foregoing, various improvements have been attempted. Up to the present, however, no ink is known that can settle all the problems in the above drying performance, print quality level and also anti-clogging.

SUMMARY OF THE INVENTION

Accordingly, the objects of the present invention is to provide an ink that can prevent clogging of pen points of writing implements or clogging of printer heads even when printers are stopped for a while and stopped for a long period of time, enables restoration with ease even when clogging has occurred, and yet can form on a recording medium an image with a high quality level, formed of round dots with less irregular feathering. Other objects of the present invention are to provide an ink-jet recording process making use of it, and to provide instrument making use of such an ink.

The above objects of the present invention can be achieved by the present invention described below. The present invention provides an ink comprising a recording agent and a liquid medium capable of dissolving or dispersing the recording agent, wherein said ink contains both a compound represented by the following Formula (I) and a compound represented by the following Formula (II):

(I)

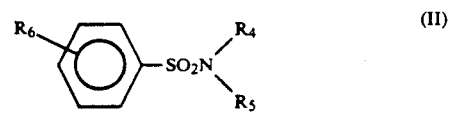

(II)

wherein $R_1$, $R_2$ and $R_3$ each represent an alkyl group or a hydroxyalkyl group, and any one of them may represent a hydrogen atom; $X^-$ represents an inorganic acid ion; $R_4$ and $R_5$ each represent a group selected from a hydrogen atom, an alkyl group and a hydroxyalkyl group; and $R_6$ represents a group selected from a carboxyl group, a hydroxyl group, a sulfone group, an alkyl group and a hydrogen atom.

The present invention also provides an ink-jet recording process comprising ejecting ink droplets from an orifice in accordance with a recording signal to make a record on a recording medium, wherein the ink as described above is used.

The present invention also provides a recording unit comprising an ink holder that has held an ink and a head from which the ink is ejected in the form of ink droplets, wherein the ink described above is used as ink.

The present invention further provides an ink cartridge comprising an ink holder that has held an ink, wherein the ink as described above is used as ink.

The present invention still further provides an ink-jet recording apparatus comprising a recording unit comprising an ink holder that has held an ink and a head from which the ink is ejected in the form of ink droplets, wherein the ink as described above is used as ink.

The present invention still further provides an ink-jet recording apparatus comprising a recording head from which ink droplets are ejected, an ink cartridge having an ink holder that has held an ink, and an ink feeder that feeds ink from said ink cartridge to said recording head, wherein the ink as described above is used as ink.

BRIEF DESCRIPTION OF THE DRAWINGS

FIG. 4 is a cross-sectional illustration of an ink cartridge.

FIG. 5 is a perspective illustration of a recording unit.

DESCRIPTION OF THE PREFERRED EMBODIMENTS

Figure 1A:
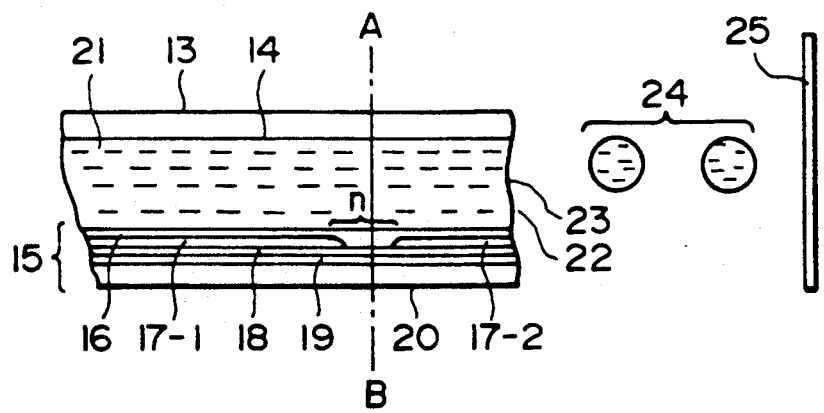
FIGS. 1A and 1B illustrate a vertical cross section and a transverse cross section, respectively, of a head of an ink-jet recording apparatus.

In order to improve the anti-clogging performance and the properties of giving a high image quality with less feathering, the present inventors made intensive studies on various manners of ink composition. As a result, they have discovered that the anti-clogging performance can be much improved and also, even if the volatile components in the ink present at the nozzle tips of a printer head have been completely evaporated, the nozzles can be restored with much greater ease when the compound represented by Formula (I) and the compound represented by Formula (II) are used in combination in ink than when these are respectively used alone. Such phenomena can be presumed to be due to the fact that a cooperative effect of the compound represented by Formula (I) and the compound represented by Formula (II) makes it more highly achievable to improve the solubility of dyes, to suppress the viscosity from increasing when ink becomes thick, and to moderate the aggregation and deposition of dyes that occur when liquid components are completely evaporated. Because of such an effect, the number of operations to restore a printer system from clogging and the consumption of ink that accompanies such operations can be decreased to the utmost, so that it becomes possible to use more efficiently than ever a given amount of the ink to be charged to a printer.

The ink containing the compound represented by Formula (I) and the compound represented by Formula (II), when ejected in the form of minute droplets from the nozzles of a printer head, undergoes an abrupt change in ink composition as it evaporates from and penetrates into a recording medium, so that the compound represented by Formula (I) and the compound represented by Formula (II) are immediately thickened and crystallized, and hence the dots formed by printing can retain round forms with less irregular feathering.

The present invention will be described below in greater detail by giving preferred embodiments.

The compound represented by Formula (I) used in the present invention includes a hydrochloride, a hydrobromide, a sulfate, a phosphate or a nitrate of each of trimethylamine, triethylamine, triethanolamine, diethylamine, diethanolamine and dipropylamine. Of these, a hydrochloride of trimethylamine, triethylamine or triethanolamine is particularly preferred because of its superior effect of anti-clogging.

Preferred examples of the compound represented by Formula (II) used in the present invention are shown below, which are by no means limited to these:

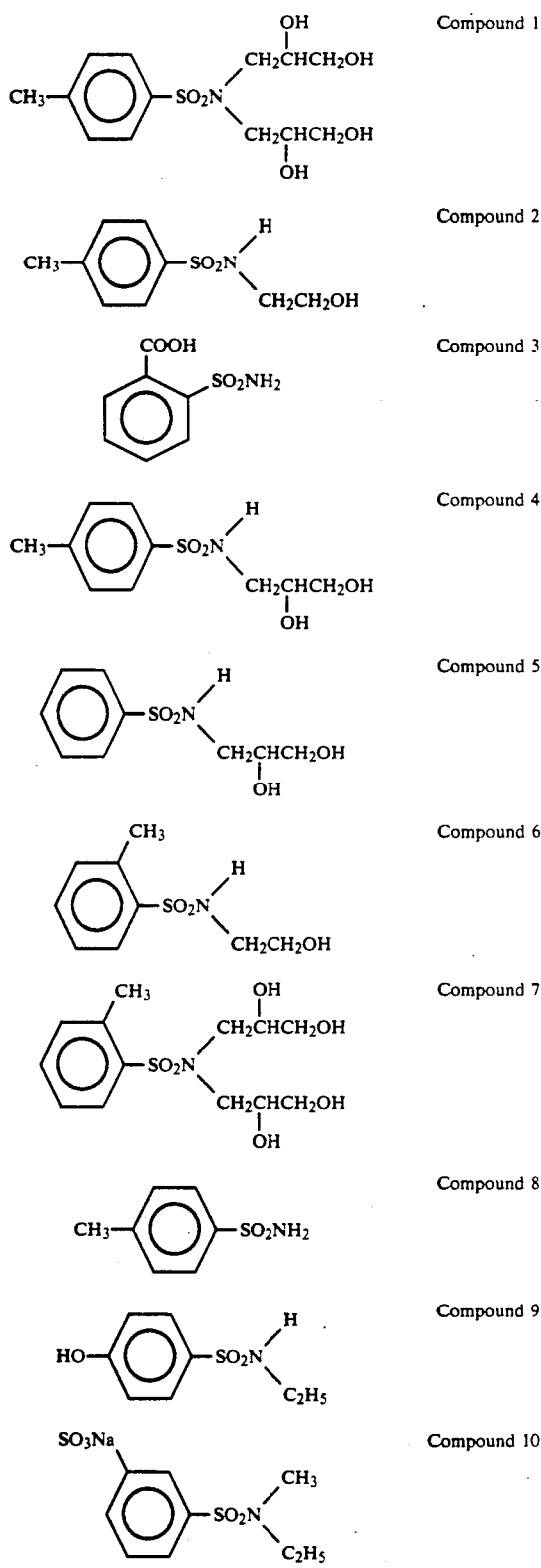

Of these compounds, compounds 1 to 4, 6 and 7 are particularly preferred because of their high solubility to water and superior effect of anti-clogging. The compound represented by Formula (I) and the compound represented by Formula (II) may each be used by mixture of one or more kinds. The anti-clogging performance, print quality level and print drying performance can be achieved in an optimum balance when the compound represented by Formula (I) and the compound represented by Formula (II) are used in a mixing ratio (weight ratio) ranging from 9/1 to 1/9, and preferably from 7/3 to 3/7. The desired results can also be obtained when a mixed solvent system used in the present invention is contained in the ink in an amount of from 0.5 wt. % to 2.0 wt. %, and particularly preferably from 1 wt. % to 10 wt. %.

As coloring materials used in the present invention, almost all of water-soluble acid dyes, direct dyes, basic dyes and reactive dyes as described in Color Index can be used.

Those which are not described in Color Index can also be used so long as they are water-soluble dyes.

There are no particular limitations on the amount of these dyes used. In usual instances, it may preferably be in the range of from 0.1 wt. % to 15 wt. %, and more preferably from 0.1 wt. % to 10 wt. %, based on the total weight of the ink.

In addition to the above components, the ink of the present invention may optionally be incorporated with various additives such as a water-soluble organic solvent, a surface active agent, a pH adjustor, a rust preventive, an antiseptic mildewproofing agent, an antioxidant, an evaporation accelerator, a chelating agent and a water-soluble polymer.

The liquid medium used in the present invention may preferably be comprised of a mixed solvent of water and a water-soluble organic solvent.

The water-soluble organic solvent may specifically include amides such as dimethylformamide and dimethylacetamide; ketones such as acetone; ethers such as tetrahydrofuran and dioxane; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol methyl (or ethyl) ether, diethylene glycol methyl (or ethyl) ether and triethylene glycol monomethyl (or ethyl) ether; N-methyl-2-pyrrolidone, 1,3-dimethyl-2-imidazolidinone, triethanolamine, sulfolane, dimethyl sulfoxide, etc.

The above water-soluble organic solvent may preferably be contained in an amount ranging from 1 wt. % to 40 wt. %, and more preferably from 3 wt. % to 30 wt. %. Wetting agents such as polyhydric alcohols commonly used particularly for the purpose of anti-clogging may not be used in a large quantity because of the cooperative effect of the compound represented by Formula (I) and the compound represented by Formula (II). There was obtained the result that when a wetting agent was contained in an amount of 40 wt. % or more, the print drying performance on paper and the print quality level were lowered. The water used in the ink is contained in an amount of from 40 wt. % to 95 wt. %. An amount less than 40 wt. % results in an increase in the viscosity of ink, so that the penetrability on paper in the vertical direction may become poor. As a result, the irregular feathering in the lateral direction was promoted, and both the print drying performance and the print quality level tend to be deteriorated. An amount more than 95 wt. % results in excessive volatile components which make it impossible to achieve satisfactory fixing performance.

The ink of the present invention is particularly preferable in the case when applied in ink-jet recording of the type in which the ink is ejected utilizing a phenomenon of ink bubbling caused by heat energy, and has the features that ejection is highly stabilized and no satellite dots are generated. In this case, however, the values of thermal properties, e.g., specific heat, coefficient of thermal expansion, and thermal conductivity must be controlled in some instances.

The ink of the present invention can settle the problems concerning the feathering, the drying performance of recorded letters or the like and the penetrability, that arise when recording is carried out on plain paper or the like. At the same time, it can match the recording head in an improved state. From these viewpoints, the physical properties of the ink itself should be controlled to give a surface tension of from 30 dyne/cm to 68 dyne/cm at 25° C. and a viscosity of not more than 15 cP, preferably not more than 10 cP, and more preferably not more than 5 cP.

Thus, in order to control the ink to have the above physical properties and settle the problems involved in the plain paper, the ink of the present invention should preferably be controlled to have a water content of not less than 50 wt. %, and preferably not less than 60 wt. %.

The ink of the present invention can be particularly preferably used in the ink-jet recording in which recording is carried out by ejecting ink droplets by the action of heat energy. Needless to say, however, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by the action of the heat energy.

Figure 1B:
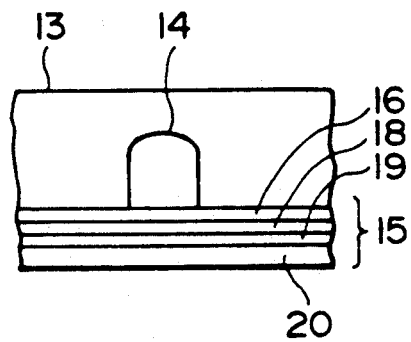
Figure 2:
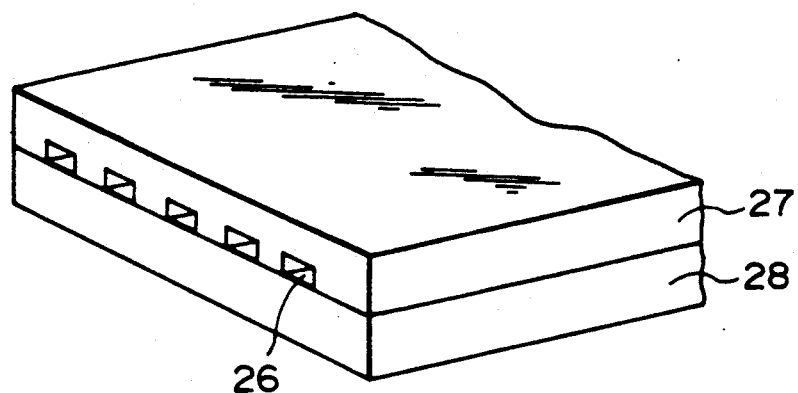
FIG. 2 is a perspective illustration of the appearance of a head comprised of a multiple set of the head as shown in FIGS. 1A and 1B.

FIGS. 1A, 1B and 2 show an example of the construction of the head, which is a main component of the apparatus.

A head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, a heating resistor layer 18 formed of aluminum electrodes 17-1 and 17-2, nichrome and so forth, a heat accumulating layer 19, and a substrate 20 of alumina, etc. with good heat dissipation properties.

The ink 21 reaches an ejection orifice (a minute opening) 22 and a meniscus 23 is formed there by a pressure P.

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 2 illustrates the appearance of a multi-head comprising the head as shown in FIG. 1A arranged in a large number. The multi-head is prepared by closely adhering a glass plate 27 having a multi-channel 26, to a heating head 28 similar to the head as illustrated in FIG. 1A.

FIG. 1A is a cross-sectional view of the head 13 along its ink flow path, and FIG. 1B is a cross-sectional view along the line A—B.

Figure 3:
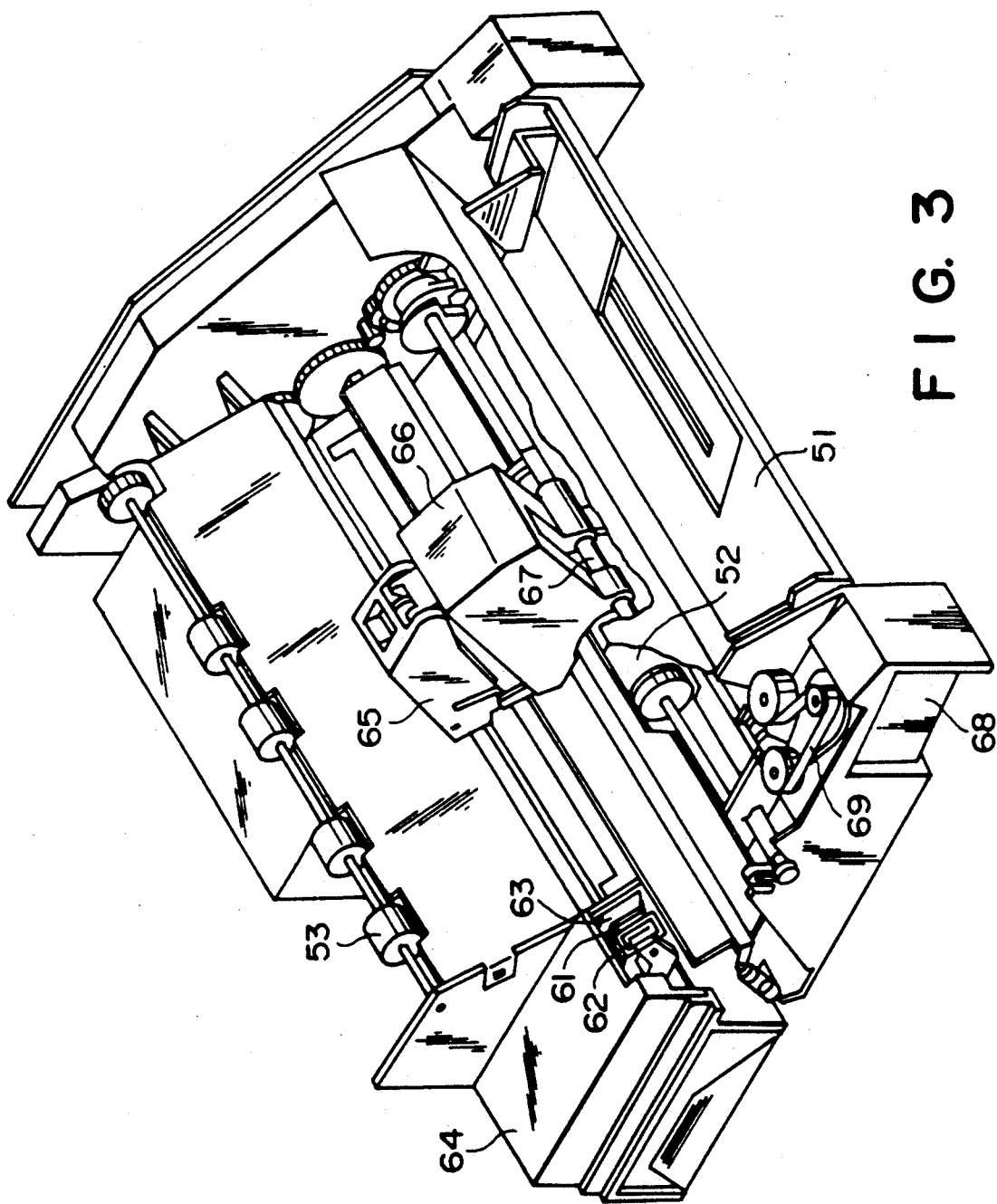
FIG. 3 is a perspective illustration of an example of ink-jet recording apparatus.

FIG. 3 shows an example of an ink-jet recording apparatus in which such a head has been incorporated.

In FIG. 3, the numeral 61 denotes a blade serving as a wiping member, one end of which is a stationary end retained by a blade-retaining member to have the form of a cantilever. The blade 61 is provided at the position adjacent to the region in which a recording head makes a record. In the present example, the blade is retained in such a form that it projects to the course through which the recording head is moved. The numeral 62 denotes a cap, which is provided at the home position adjacent to the blade 61, and is so constituted that it moves in the direction perpendicular to the direction in which the recording head is moved and comes into contact with the face of ejection openings to carry out capping. The numeral 63 denotes an absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove the water, dust or the like from the ink ejection opening face.

The numeral 65 denotes the recording head having an ejection energy generating means and ejects ink to the recording medium set opposingly to the ejection opening face provided with ejection openings, to carry out recording. The numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide shaft 67 and hence the recording head 65 can be moved from a recording region to a region adjacent thereto.

The numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above construction, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

FIG. 4 shows an example of an ink cartridge that has held the ink being fed to the head through an ink-feeding member as exemplified by a tube. Herein the numeral 40 denotes an ink holder that has held the feeding ink, as exemplified by an ink bag. The top thereof is provided with a stopper 42 made of rubber. A needle (not shown) may be inserted to this stopper 42 so that the ink in the ink bag 40 can be fed to the head. The numeral 44 denotes an absorber that receives waste ink.

It is preferred in the present invention that the ink holder is formed of a polyolefin, in particular, polyethylene, at its surface with which the ink comes into contact.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, the numeral 70 denotes a recording unit, in the interior of which an ink holder that has held an ink, as exemplified by an ink absorber, is contained. The recording unit is so constructed that the ink in such an ink absorber is ejected in the form of ink droplets from a head 71 having a plurality of orifices. As a material for the ink absorber, it is preferred in the present invention to use polyurethane.

The numeral 72 denotes an air path opening through which the interior of the recording unit is communicated with the air.

This recording unit 70 can be used in place of the recording head shown in FIG. 3, and is detachably mounted to the carriage 66.

EXAMPLES

The present invention will be described below by giving Examples and Comparative Examples. In the following, "part(s)" refers to "part(s)" by "weight".

EXAMPLES 1 TO 7, COMPARATIVE EXAMPLES 1 TO 4

The respective components as shown in Table 1 were mixed and throughly stirred to carry out dissolution. Thereafter, the resulting solution was subjected to pressure filtration using Fluoro pore Filter (trade name; manufactured by Sumitomo Electric Industries, Ltd.) of 0.45 μm in pore size. Inks of the present invention and those of Comparative Examples were thus prepared.

TABLE 1

| Ink composition | Example | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| Dye: | | | | | | | | | | | |
| C.I. Direct Black 154 | 3 | | 5 | | 4 | | | 3 | 5 | | 4 |
| C.I. Food Black 2 | | 4 | | 3 | | 3 | 3 | | | 3 | |

TABLE 1-continued

| Ink composition | Example (parts) | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| Organic solvent: | | | | | | | | | | | |
| Glycerol | 10 | | | 5 | | | | 5 | | | 5 |
| Diethylene glycol | | 5 | | 10 | | 10 | 10 | | | 40 | |
| Triethylene glycol | | | 10 | | | | | 5 | 10 | | |
| Diethylene glycol monophenyl ether | | | | | 2 | | | 2 | | | 2 |
| Ethyl alcohol | | 5 | | 4 | | 4 | 4 | | | | |
| Compound of Formula (I): | | | | | | | | | | | |
| Triethylamine hydrochloride | 2 | | | 3 | | 3 | | | | | |
| Triethanolamine hydrochloride | | 4 | | | 4 | | | | | | |
| Dimethylamine hydrobromide | | | 3 | | | | 3 | 3 | | | |
| Compound of Formula (II): | | | | | | | | | | | |
| Compound 1 | 3 | | | | | | | | | | |
| Compound 2 | | 2 | | | 5 | | | | | | |
| Compound 3 | | | 3 | | | | | | | | |
| Compound 4 | | | | 4 | | | | 3 | | | |
| Compound 6 | | | | | | 3 | | | | | |
| Compound 7 | | | | | | | 5 | | | | |
| Water | 82 | 80 | 79 | 76 | 80 | 77 | 75 | 82 | 82 | 57 | 89 |

Next, recording was carried out using the resulting inks of Examples 1 to 7 and Comparative Examples 1 to 4 and also using as an ink-jet recording apparatus an ink-jet printer BJ-130A (trade name; manufactured by Canon Inc.) of the type in which a heater element is used as energy source for the ejection of ink, and the print drying performance, the anti-clogging performance and the print quality level were evaluated. Results obtained are shown in Table 2.

EVALUATION METHOD AND EVALUATION CRITERIONS

(1) Print Drying Performance

The print drying performance was judged on the basis of the seconds taken after English letters were printed on a commercially available continuous slip paper and before the prints are no longer stained when rubbed with a filter paper No. 2 (trade name; manufactured by Toyo Roshi K. K.) after 10, 20, 30, 40, 50 and 60 seconds. (Measured at 20°±5° C., 50±10% RH)

A: 15 seconds or less
B: 16 to 30 seconds
C: 31 seconds or more

(2) Evaluation on Anti-clogging Performance

A given ink was charged in the printer. English letters were continuously printed for 10 minutes and thereafter the printing was stopped. After the printer was left to stand for 30 days in a capped state (conditions for standing: 60° C., 10±5% RH), English letters were again printed. The evaluation was made on the basis of the times of the operation for restoration, carried out until the initial state of prints can be reproduced.

AA: Printing of the same performance as the initial printing was possible without operation for restoration.
A: Printing of the same performance as the initial printing was possible after restoration was carried out once to 5 times
B: Printing of the same performance as the initial printing was possible after restoration was carried out 6 to 10 times.
C: Printing of the same performance as the initial printing was possible after restoration was carried out 11 times or more.

(3) Evaluation on Print Quality Level

Letters were printed on a commercially available copy paper (Xerox 4024), and then left to stand for 1 hour or more. Thereafter, the feathering on the level of dots and the sharpness of edges were evaluated under environmental conditions of 25° C. and 60% RH.

A: No feathering with sharp edges.
B: Feathering occurred a little, with slightly blurred edges.
C: Feathering greatly occurred, with blurred dots and edges.

TABLE 2

| Evaluation item | Example | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| (1) | A | A | A | A | A | A | A | A | A | C | A |
| (2) | AA | AA | AA | AA | AA | AA | AA | C | B | A | C |
| (3) | A | A | A | A | A | A | A | B | A | C | B |

As described above, the present invention makes it possible to carry out recording that can be free from feathering, can achieve a superior quality level and also can achieve a good penetrability even on the usual plain paper such as copy paper, reporting paper, notepaper or letter paper commonly used in offices.

Moreover, according to the ink of the present invention, it is possible to carry out highly reliable recording that does not cause clogging of pen points of writing implements or clogging in the nozzles of the head for ink-jet recording.

We claim:

1. An ink comprising a recording agent and a liquid medium capable of dissolving or dispersing the recording agent, wherein said ink contains both a compound represented by the following Formula (I) and a compound represented by the following Formula (II) wherein the total amount of said compounds is in the range of from 0.5 wt. % to 20 wt. % based on the total weight of the ink

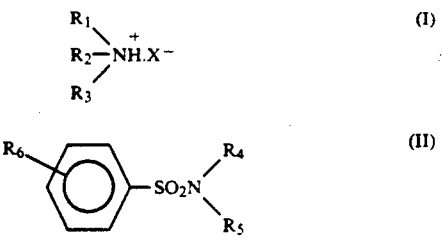

wherein $R_1$, $R_2$ and $R_3$ each represent an alkyl group or a hydroxyalkyl group, and any one of them may represent a hydrogen atom; $X^-$ represents an inorganic acid ion; $R_4$ and $R_5$ each represent a group selected from a hydrogen atom, an alkyl group and a hydroxyalkyl group; and $R_6$ represents a group selected from a carboxyl group, a hydroxyl group, a sulfone group, an alkyl group and a hydrogen atom and wherein said compound represented by Formula (I) and compound represented by Formula (II) are mixed in a proportion ranging from 9:1 to 1:9 in weight ratio.

2. An ink according to claim 1, wherein the compound represented by Formula (I) is a hydrochloride of a compound selected from the group consisting of trimethylamine, triethylamine and triethanolamine.

3. An ink according to claim 1, wherein said liquid medium comprises a mixed solvent of water and a water-soluble organic solvent.

4. An ink according to claim 3, wherein said water is contained in an amount of from 40 wt. % to 95 wt. % based on the total weight of the ink.

5. An ink according to claim 3, wherein said water-soluble organic solvent is contained in an amount of from 1 wt. % to 40 wt. % based on the total weight of the ink.

* * * * *

UNITED STATES PATENT AND TRADEMARK OFFICE
CERTIFICATE OF CORRECTION

PATENT NO. : 5,078,790
DATED : January 7, 1992
INVENTOR(S) : Shinichi Tochihara, et al.

It is certified that error appears in the above-identified patent and that said Letters Patent is hereby corrected as shown below:

COLUMN 1:

Line 44, "kind" should read --kinds--.

COLUMN 2:

Line 11, "is" should read --are--;
   Line 15, "enables" should read --enable--;

COLUMN 6:

Line 47, "is not" should read --it is not--.

COLUMN 9:

Line 34, "CRITERIONS" should read --CRITERIA--;
   Line 40, "are" should read --were--.

Signed and Sealed this

Eighth Day of June, 1993

Attest:

MICHAEL K. KIRK

*Attesting Officer*      *Acting Commissioner of Patents and Trademarks*